United States Patent [19]

Markland

[11] Patent Number: 4,553,782

[45] Date of Patent: Nov. 19, 1985

[54] AIR RESISTANCE REDUCING ASSEMBLY FOR TRUCKS

[75] Inventor: Richard D. Markland, Cupertino, Calif.

[73] Assignee: Consolidated Freightways, Inc., Menlo Park, Calif.

[21] Appl. No.: 580,111

[22] Filed: Feb. 14, 1984

Related U.S. Application Data

[63] Continuation-in-part of Ser. No. 385,896, Jun. 7, 1982, abandoned.

[51] Int. Cl.4 ............................................. B62D 35/00
[52] U.S. Cl. ..................................................... 296/1 S
[58] Field of Search ................................. 296/1 S, 91

[56] References Cited

U.S. PATENT DOCUMENTS

| | | | |
|---|---|---|---|
| 2,863,695 | 12/1958 | Stamm | 296/1 S |
| 4,022,508 | 5/1977 | Kirsch et al. | 296/1 S |
| 4,281,869 | 8/1981 | Saint | 296/1 S |
| 4,360,232 | 11/1982 | Elder | 296/1 S |

*Primary Examiner*—Robert R. Song
*Attorney, Agent, or Firm*—Flehr, Hohbach, Test, Albritton, and Herbert

[57] ABSTRACT

An air resistance reducing assembly for use in tandemly coupled vehicles, one of the vehicles being a hauling, another of the vehicles being a trailing vehicle, the trailing vehicle including a front wall and a top panel, an the air deflector having leading and trailing edges disposed transversely of the direction of forward movement of the vehicles and carried at an upper leading end portion of the trailing vehicle, the deflector overlying the surface of upper leading end portion while remaining disposed respectively behind and below the plane of the front wall and the top panel, the air deflector being formed and disposed to deflect air to pass therebeneath adjacent the surface of the upper leading end portion and along the top of the trailing vehicle.

4 Claims, 5 Drawing Figures

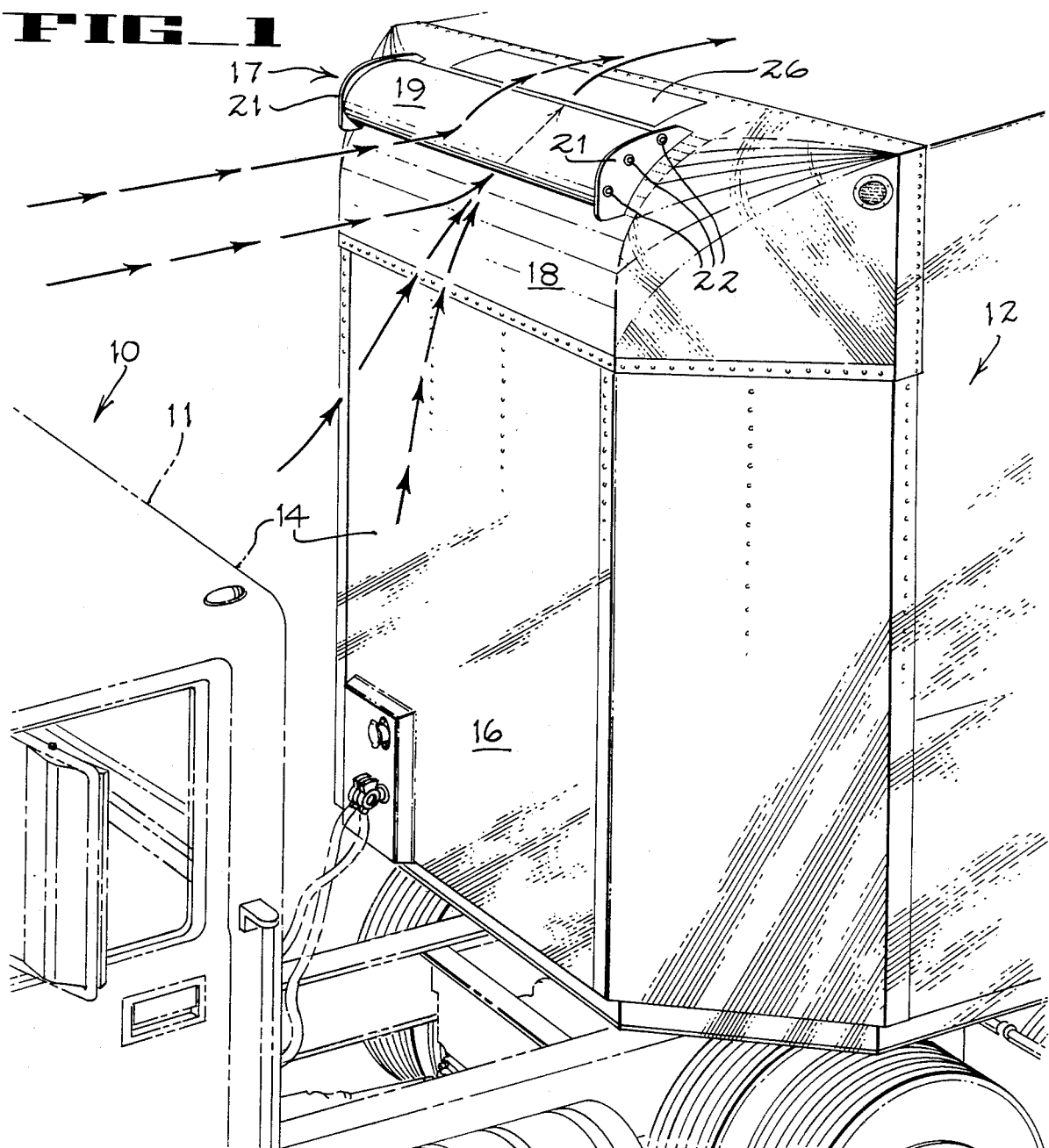
FIG_1
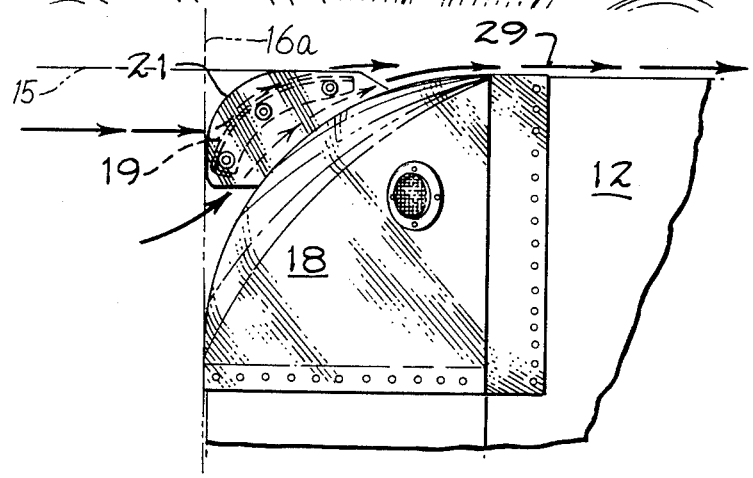
FIG_2

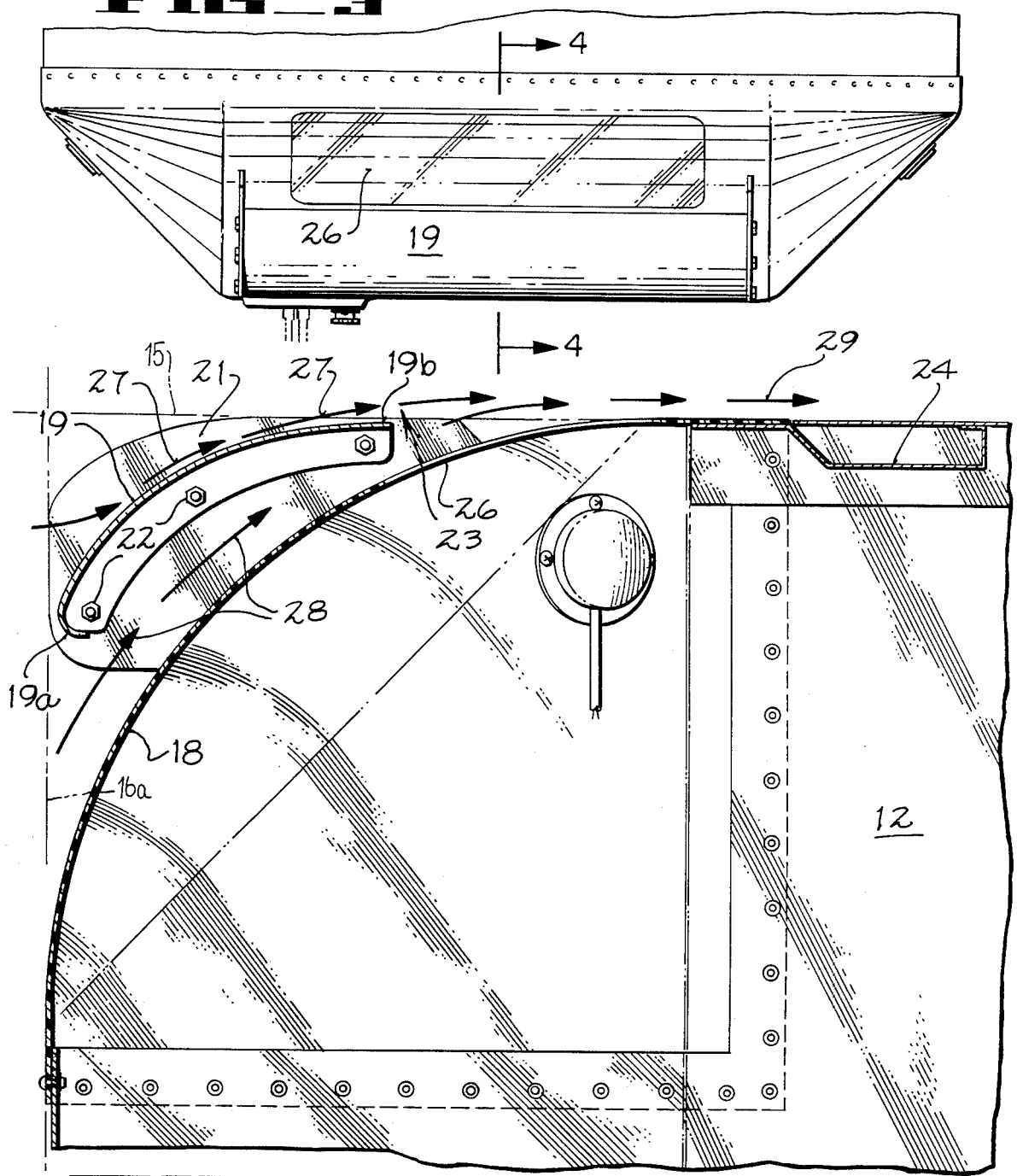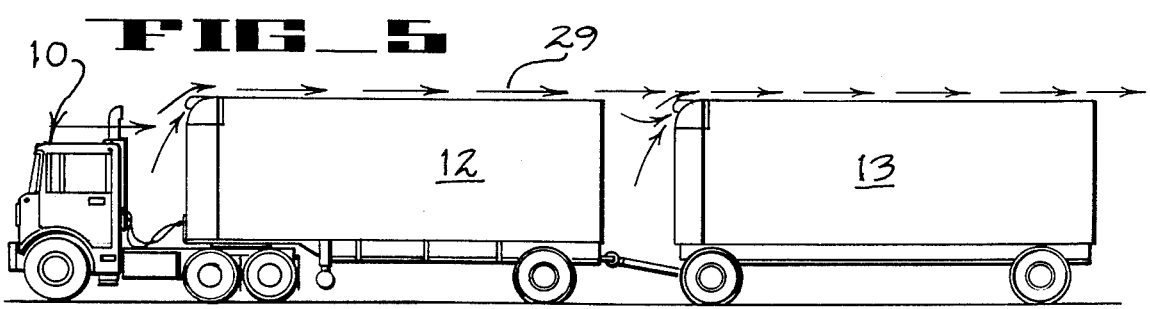

AIR RESISTANCE REDUCING ASSEMBLY FOR TRUCKS

This is a continuation-in-part of Ser. No. 385,896, filed June 7, 1982, now abandoned.

This invention pertains to an air resistance reducing assembly for reducing the drag following trucks so as to improve fuel efficiency.

In the past, trucks such as trailers drawn by tractor units have employed relatively large air deflecting shields mounted at an angle on the roof of the tractor unit. Certain problems have been created by this technique and there has been a need for an improved air deflector.

In general, and as described in detail further below, for use with tandemly coupled hauling and trailing vehicles, an air resistance reducing assembly comprises an air deflector unit carried by a trailed vehicle at the upper leading end thereof and disposed to extend transversely of the direction of forward movement of the trailed vehicle. The deflector unit, formed and disposed to deflect and pass air therebeneath along the top of the trailed vehicle serves to evacuate sufficient air from behind the hauling vehible to substantially reduce drag otherwise acting thereon.

Preferably, the roof beneath the deflector has been formed with an arcuately curved surface with means for supporting the deflector panel in spaced relation from the curved surface. The leading edge of the deflector panel is spaced further from the curved surface than the spacing between the trailing edge thereof and the curved surface. This provides a region of convergent flow from both above and below the panel which creates a region of low pressure for withdrawing air from behind the hauling vehicle. The discharge from the deflector serves to hold the air flow closely adjacent the top surfaces of the trailing vehicle.

In general, it is an object of the present invention to provide an improved air deflector for an type vehicles.

Another object of the invention is to provide means for increasing the fuel efficiency of a tractor-trailer rig by reducing the drag from dead air following a vehicle.

A further object of the invention is to provide an air deflector assembly of the kind described for reducing drag following a vehicle wherein the assembly is carried externally in a manner which permits full articulation between a pair of such trailers coupled together.

An additional object of the invention is to provide an air deflector assembly supported externally in spaced relation to a curved upper, leading transverse surface of a trailer in a manner disposing the assembly behind and below the extension of the planes defined by the front and top walls of the trailer respectively.

Yet an additional object of the invention is to provide an air deflector assembly of the kind described wherein the curved, transverse surface extends beyond the leading and trailing edges of the air deflector panel to enhance convergent air flow.

Yet another object of the invention is to provide an improved skylight in a trailed vehicle located with respect to the deflector so as to deflect airborne contaminating material from engaging and discoloring the skylight.

The foregoing and other objects of the invention will become more readily evident when considered in conjunction with the drawings.

FIG. 1 shows a diagrammatic perspective view of that portion of tandemly coupled vehicles according to the invention;

FIG. 2 shows a side elevation view of an air deflector according to the invention;

FIG. 3 shows a plan view of the leading end of a trailer according to the invention;

FIG. 4 shows a side elevation section view taken along the line 4—4 of FIG. 3; and FIG. 5 shows a diagrammatic view of a tractor unit hauling a pair of van style trailer units each equipped with wind deflector means according to the invention.

Operation of tandemly coupled vehicles wherein one of the vehicles may be considered a hauling vehicle and another a trailing vehicle will normally include an aerodynamic drag acting from behind. This drag serves to act upon and tends to retard the vehicle movement through air. Generally, the drag will act parallel and opposite to the direction of movement of the vehicle. As described herein means have been provided for reducing such drag as may exist, for example, behind the cab 11 of a tractor unit 10. In addition, and as diagrammatically shown in FIG. 5, means have been provided for reducing the drag following a trailer 12 where a plurality of trailers 12, 13 are coupled in tandem to be hauled as "doubles".

In operation, the region 14 defined between the leading end 16 of a van type of trailer 12 and the back wall of tractor 10 tends to collect dead air to apply a drag to the forward movement of tractor unit 10.

Means for removing this dead air includes an air deflector assembly 17 carried by the trailer 12 transversely of the direction of forward movement of trailer 12 and disposed in spaced relation to a curved surface 18 at an upper leading end portion. Deflector assembly 17 includes an air deflection panel 19 formed to include an arcuate shape as viewed in end elevation cross-section and generally similar to the curvature of surface 18 of trailer 12 beneath panel 19, for purposes as described further below.

Means supporting panel 19 in spaced relation from surface 18 includes the pair of brackets 21. The ends of panel 19 have been bent substantially normal to the surface of panel 19 whereby suitable fastening means 22 serve to attach the ends of panel 19 to brackets 21.

Panel 19, as best shown in FIG. 4, is mounted from brackets 21 in a manner whereby the leading edge 19a of panel 19 has been spaced a greater distance from surface 18 than the spacing defined between the trailing edge 19b and surface 18. In this manner, a region 23 of convergent flow from airstreams 27, 28 both above and below panel 19 has been formed. It has been observed that by providing such an arrangement the air following behind tractor unit 10 can be withdrawn sufficiently to reduce the drag acting thereon.

It has been observed that extending the curved surface 18 beyond the leading and trailing edges 19a, 19b respectively of deflector panel 19 provides improved convergent air flow.

In addition to the above, by providing a panel 19 of the kind described, the air flow 29 is held closely adjacent the top surfaces of trailer 12.

Air deflection devices of the type presently known inherently add to the outside length of the trailer. Since the legal height, width and length of trailers has been clearly fixed by statute and vigorously enforced, truck operators are faced with a dilemma when considering the addition of externally mounted devices. If they conform to the length requirements, the volume (and cargo capacity) of the trailers will be reduced. If they do not conform, they are in violation of the law.

In addition, where a pair of trailers are coupled in tandem to provide a "doubles" unit, the turning or "swing" radius defined between the pair of trailers will be sufficiently reduced by adding external devices therebetween so as to interfere with its ability to turn corners. In short, the external air deflection devices can become mashed and prevent the two trailers from properly articulating with respect to each other in order to be able to make a given corner.

The trailers of a "doubles" unit typically are coupled in tandem using a "dolly" between pairs of trailers. The dolly consists of a pair of wheels supporting a "fifth wheel" drawn by an elongate tongue. However, with external air deflection devices attached between the trailers, the usual dolly will not permit the two trailers to articulate efficiently with respect to each other to permit the "doubles" unit to turn corners and to pass across abrupt changes in grade of the road without bumping each other.

To prevent the confronting ends of the "doubles" unit from contacting each other during turning (or when passing across an abrupt change in grade) the trucker can employ a so-called "converted" dolly which simply has a much longer tongue. However, the overall length of the "doubles" unit is also carefully proscribed by statute so that in addition to the annoyance of having to replace the standard dolly unit with a different dolly, the cargo capacity of the "doubles" unit will need to be reduced to stay within the overall length requirement for "doubles" units.

Accordingly, by rounding off the upper leading transverse edge of trailer 12 (or 13) air deflection assembly 17 has been designed, as shown in FIGS. 2 and 4, to lie behind the extension of the plane defined by the leading end wall 16 (and represented by phantom line 16a) as well as below the extension of the plane defined by the roof or top panel of trailer 12 (or 13) (and represented by phantom line 15). In this way, the "swing radius" between trailers need not be extended by employing "converted dollies", and at the same time the confronting ends of the two trailers will not bump against one another.

As thus arranged, an air resistance reducing assembly employs a relieved portion of the trailer whereby an air deflector assembly lies behind the plane of the front wall and beneath the plane of the top panel of the trailer. The upper leading end portion of the trailing vehicle has been rounded over so as to provide a negligible loss in cargo space while at the same time providing a location for the externally mounted air deflector assembly without requiring additional spacing between the confronting ends of the trailers.

Accordingly, "doubles" units can still be employed without the annoyance of having to use a converted dolly; the statutory length for each trailer is preserved as well as the overall length of the "doubles unit"; and the two trailers of a "doubles unit" are permitted to articulate sufficiently to permit the rig to turn corners, notwithstanding the presence of the externally located air deflector assembly.

Transversely extending strengthening elements such as the element 24 have been distributed, as is known, along the roof of trailer 12.

Surface 18 of trailer 12 (or trailer 13) may include a window 26 formed of a material for passing light into trailer 12. Disposing window 26 adjacent to the confluence of airstreams 27, 28 from both above and below panel 19 serves to permit the airflow to deflect airborne contaminating materials (such as insects, dirt and the like) from becoming attached to window 26. Accordingly, window 26 remains relatively clean for a longer period of time.

While the foregoing explanation of the invention has been described in conjunction with a tractor arrangement, it has also been observed that a substantial drag can be generated behind a given trailer or between pairs of trailers coupled together in tandem. Accordingly, as shown diagrammatically in FIG. 5, trailer 12 has been equipped as described above and trailer 13 similarly equipped for evacuating some of the dead air from behind trailer 12. Accordingly, in FIG. 5, trailer 12 becomes the hauling vehicle for trailer 13, whereas tractor 10 is the hauling vehicle for trailer 12.

From the foregoing it should be readily evident that the provision of the arcuate panel 19, as arranged, serves to reduce drag following a hauling vehicle located immediately ahead of it and in this way serves to create an increased fuel efficiency.

While the trailers illustrated herein are of the "wedge-nose" style, the invention also pertains to other trailers such as semi-trailers.

I claim:

1. An air resistance assembly for use in combination with tandemly coupled vehicles, one of said vehicles being a hauling vehicle, another of said vehicles being a trailing vehicle, said hauling vehicle and said trailing vehicle each normally having a drag following therebehind serving to act upon and tend to retard the vehicle movement through air, said drag acting parallel and opposite to the direction of movement of said vehicles, said trailing vehicle including a front wall and a top panel, air deflector means having leading and trailing edges disposed transversely of the direction of forward movement of said vehicles and carried at an upper leading end portion of said trailing vehicle, said deflector overlying the surface of said upper leading end portion while remaining disposed respectively behind and below the plane of said front wall and said top panel, said air deflector means being formed and disposed to deflect air to pass therebeneath adjacent the surface of said upper leading end portion and along the top of said trailing vehicle, the last named said means serving to evacuate sufficient air from behind the hauling vehicle to substantially reduce said drag acting thereon.

2. An air resistance reducing assembly for use in combination with tandemly coupled vehicles, one of said vehicles being a hauling vehicle, another of said vehicles being a trailing vehicle, said hauling vehicle and said trailing vehicle normally having a drag following therebehind serving to act upon and tend to retard the vehicle movement through air, said drag acting parallel and opposite to the direction of movement of said vehicles, said trailing vehicle including a front wall and a top panel, air deflector means disposed transversely of the direction of forward movement of said vehicles and carried at an upper leading end portion of said trailing vehicle, said upper leading end portion being sufficiently relieved to dispose said air deflector means behind the plane of said front wall and beneath the plane of said top panel, said air deflector means being formed and disposed to deflect and pass air therebeneath along said upper leading end portion and along the top panel of said trailing vehicle, the last named said means serving to evacuate sufficient air from behind the hauling vehicle to substantially reduce said drag acting thereon.

3. An air resistance reducing assembly according to claim 2 in which said last named means comprises an air deflection panel formed to include an arcuate shape as viewed in end elevation cross-section thereof, said upper leading end portion of said trailing vehicle being formed with an arcuately curved surface beneath said top panel, and means supporting said air deflection panel in spaced relation from said end portion, the leading edge of said deflection panel being spaced farther from said end portion than the spacing between the trailing edge thereof and said end portion to provide a region of convergent air flow from both above and below said air deflection panel for withdrawing air from behind the hauling vehicle and to hold the air flow closely adjacent to the top surfaces of said trailing vehicle.

4. A van type trailer of a type adapted to be towed by a hauling vehicle normally having a drag following therebehind and serving to act upon and tend to retard the vehicle movement, said drag acting parallel and opposite to the direction of movement of said vehicle, said trailer having front and top walls, and an upper leading front end portion formed with an upwardly and rearwardly curved surface, an air deflection panel carried by said front end portion and lying substantially entirely behind the plane of said front wall, said panel having an arcuate shape as viewed in end elevation cross-section thereof, means supporting said panel in spaced relation from said surface and transversely of the trailer, the leading edge of said panel being spaced further from said end portion than the spacing between the trailing edge thereof and said end portion to provide a region of convergent air flow from both above and below said panel for withdrawing air from behind the hauling vehicle to relieve the drag following said hauling vehicle.

* * * * *